(12) United States Patent
Oryl (10) Patent No.: US 10,765,933 B2
(45) Date of Patent: Sep. 8, 2020

(54) CROWN CAP GAME DEVICE

(71) Applicant: Radoslaw Oryl, Warsaw (PL)

(72) Inventor: Radoslaw Oryl, Warsaw (PL)

( * ) Notice: Subject to any disclaimer, the term of this patent is extended or adjusted under 35 U.S.C. 154(b) by 0 days.

(21) Appl. No.: 16/425,263

(22) Filed: May 29, 2019

(65) Prior Publication Data

US 2019/0366198 A1   Dec. 5, 2019

(51) Int. Cl.
*A63F 9/24*   (2006.01)
*A63F 9/00*   (2006.01)
*B65D 41/34*  (2006.01)

(52) U.S. Cl.
CPC ...... *A63F 9/001* (2013.01); *A63F 2009/0015* (2013.01); *B65D 41/34* (2013.01)

(58) Field of Classification Search
CPC .... A63F 9/01; A63F 2009/0015; A63F 11/00; A63F 13/211; A63F 9/001; B65D 41/34; B65D 51/2828
See application file for complete search history.

(56) References Cited

U.S. PATENT DOCUMENTS

| 4,583,651 A | 4/1986 | Ostberg |
| 5,014,798 A * | 5/1991 | Glynn ................ G01G 11/006 |
| | | 177/132 |
| 5,351,968 A | 10/1994 | Starnes |
| 5,454,566 A | 10/1995 | Koenig |
| 5,467,985 A | 11/1995 | Jones |
| 2007/0057463 A1 | 3/2007 | Del Rincon |
| 2009/0058663 A1* | 3/2009 | Joshi ................ G01D 11/24 |
| | | 340/584 |
| 2011/0156348 A1 | 6/2011 | Ruiz |
| 2014/0266760 A1* | 9/2014 | Burke, Jr. .......... G06F 19/3462 |
| | | 340/687 |
| 2016/0324726 A1* | 11/2016 | Roberts ................ A61J 7/02 |

FOREIGN PATENT DOCUMENTS

WO   WO-2007021496 A2 *   2/2007   ......... G06F 19/3456

OTHER PUBLICATIONS

"Tiny Bluetooth Sensors Kickstarter", 2016, kickstarter.com, pp. 1-16, at https://www.kickstarter.com/projects/guardyen/tiny-bluetooth-sensors-so-you-can-make-and-connect (last visited Jul. 16, 2019). (Year: 2016).*

* cited by examiner

*Primary Examiner* — Steve Rowland
(74) *Attorney, Agent, or Firm* — Myers Wolin, LLC (57) ABSTRACT

A crown cap game device using crown caps, characterized in that a measurement device (4) with a Bluetooth module (5) is installed in the bottom (1) of a crown (3) cap (2), whereas the measurement device (4) clings to the wall (6) and the Bluetooth module (5) provides a connection with a mobile device (7) equipped with a mobile application (8) which analyzes and displays all data (9) from the measurement device (4), and then displays the data (9) on the screen (10) of the mobile device (7).

5 Claims, 5 Drawing Sheets

CROWN CAP GAME DEVICE

The present patent application is filed under 35 U.S.C. 111(a) and claims priority to Polish Application No. P. 425795, filed May 30, 2018, the content of which is incorporated by reference herein.

The object of the solution is a crown cap game device using the standard glass bottle crown caps.

The crown cap, otherwise known as the crown cork, is, next to the screw-in cap, the most popular glass bottle closure known, as it guarantees complete tightness of the bottle, and thus the preservation of the liquid contained. It is made of steel sheeting, usually coated with paint to form the manufacturer's name or logo. Inside the cap, there is a plastic layer which does not affect the taste or the odor of the liquid, and which also serves as a seal.

The dimensions of the caps are standardized, and all of them have 21 teeth which cling to the bottle.

Apart from their primary role, which is to close and seal bottles, crown caps have been long used to create various games.

The most popular games are children's cap games which all share a common element—the crown cap which is put into motion on a flat surface, using a stroke (a flick) performed with one's fingers.

Some of the most common games involve weighed caps, which are filled either with wax, modeling clay, gypsum or lead, sometimes additionally weighed with coins. They are often intricately decorated.

Many types of games involving crown caps are known.

For instance, there is the game called the "toss", where the players take turns to toss caps against a wall. The player whose cap lands closest to the wall wins and takes a cap from each of the other players.

Another example is the "battle", where the players try to hit opponent caps with their own caps, and to knock them out of the field.

In another known example of cap games called the "race", also referred to as the "peace race", the players take turns to flick their caps. The player who completes the obstacle course or a route first wins, whereas if the cap falls out of the course, the player is penalized by going back by one stroke. Additionally weighed caps have an advantage here, as they are less likely to enter into uncontrolled rolling motion. These caps are usually equipped with state flags which are either glued to the cap using modeling clay or pressed from the top using a piece of transparent plastic or stiff foil.

One of the other known games is "football", where there are two teams. In this game, one cap is designated as the ball and the players hit (flick) the ball, aiming to place it in the opponent's goal. These games are usually played on yards—directly on the asphalt or in the sandbox.

Other embodiments of the crown cap game involve computer applications or are played online, where players compete in matches using the computer, laptop, tablet or smartphone screen. These games are virtual and do not involve physical contact of the player with an actual crown cap.

In the course of these games, and particularly during tournaments, frequent disputes arise in connection with the cap movement. This applies to games involving physical contact of the player with the cap, where the cap is flicked with one's finger. Since the flicking motion is very fast, the contestants are never certain about the trajectory of the cap or about any intermediate impacts.

In this case, the VAR (Video Assistant Referee) system offers a significant opportunity to verify the results. The system is applied, among others, in football matches, and aims at preventing errors committed by in-field referees. The use of this system during crown cap tournaments and matches is however hindered due to its high price, its complexity and its large size, which makes it impossible to use anywhere games are played.

The pertinent prior art is represented, for example, by US 20110156348 A1, U.S. Pat. Nos. 5,467,985, 5,454,566, 5,351,968, US 20070057463A1, and U.S. Pat. No. 4,583,651.

The purpose of the solution is to create a crown cap game device which would combine a game consisting in its real, physical and non-virtual playing applying measurement instruments, with a mobile application for smartphones, tablets and other mobile devices, to ensure that the players compete according to the rules and that all disputes arising during games are eliminated.

The essence of the solution is a crown cap game device using crown caps, characterized in that a measurement device with a Bluetooth module is installed in the bottom of a crown cap, whereas the measurement device clings to the wall and the Bluetooth module provides a connection with a mobile device equipped with a mobile application which analyzes and displays all data from the measurement device, and then displays the data on the screen of the mobile device.

In a beneficial embodiment of the solution, a measurement device in the form of an accelerometer is installed in the bottom of the crown cap.

In a beneficial embodiment of the solution, a measurement device in the form of a gyroscope is installed in the bottom of the crown cap.

In a beneficial embodiment of the solution, measurement devices in the form of an accelerometer and a gyroscope are installed in the bottom of the crown cap.

In a beneficial embodiment of the solution, the measurement device contains a LED.

In a beneficial embodiment of the solution, an additional measurement device in the form of a magnetometer is installed in the bottom of the crown cap.

The object of the solution is presented in its various embodiments in figures referenced below.

DETAILED DESCRIPTION OF THE PREFERRED EMBODIMENTS

Figure 1:
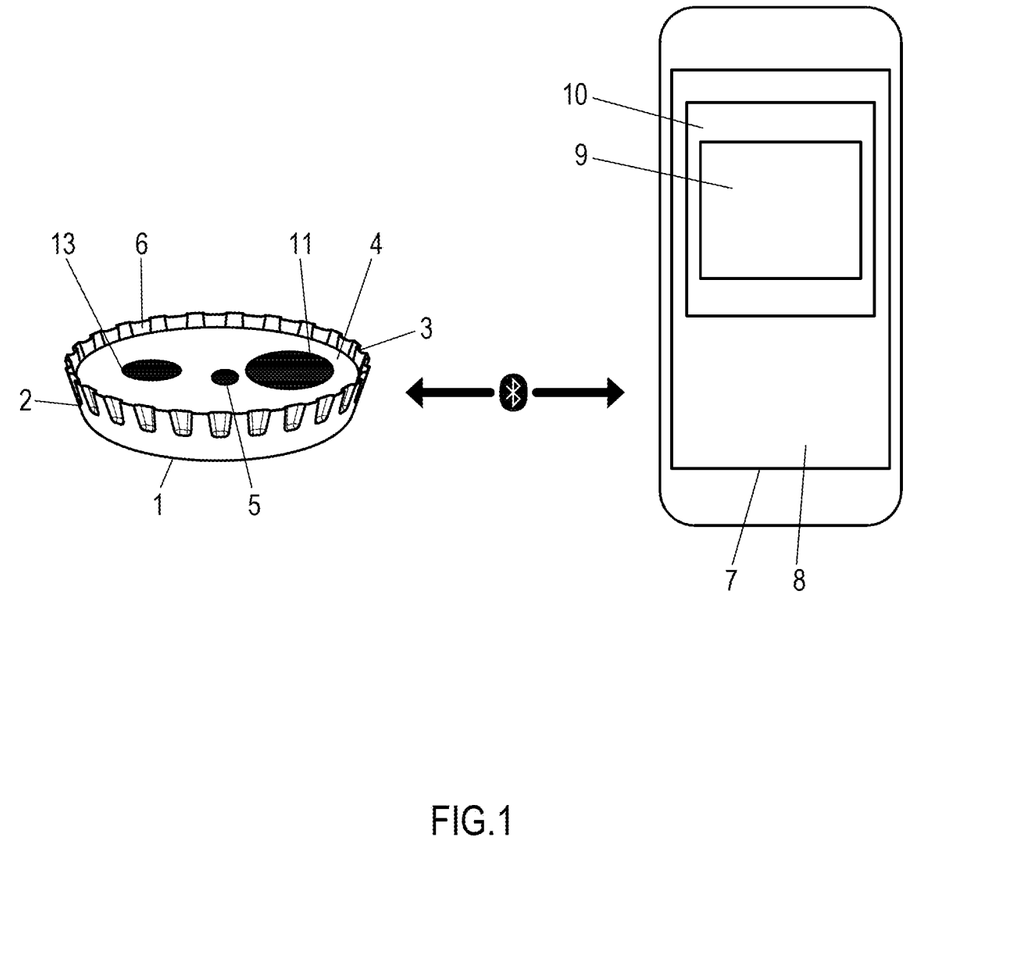
FIG. 1 shows the crown cap 2.

FIG. 1 presents a crown cap 2 where a measurement device 4 in the form of an accelerometer 11 which clings to its wall 6 is installed below the teeth 3, in the bottom 1 of the cap. The device is equipped with a Bluetooth module 5 which provides a connection with a mobile device 7. This figure includes a schematic of the mobile device 7 which is equipped with a mobile application 8. The purpose of the mobile application 8 is to analyze and display data 9 from the accelerometer 11. Using the mobile application, the user of the smartphone, tablet or any other mobile device decides which data 9 is to be analyzed and which information is to be displayed on the screen 10 of the mobile device 7. In the figure, the device in the form of an accelerometer 11 has the form of an electronic overlay placed on the cap. The figure also includes a LED 13 which can be used to visually signal the activity of the cap 2. Thanks to the Bluetooth module, the user can turn the LED 13 on via a mobile application installed on the mobile device 7, in order to identify their cap 2.

Placed next to the accelerometer 11, the Bluetooth module 5 can be used to connect to a mobile device 7, and thus to monitor and analyze the following data 9 recorded for the cap 2: impact, impact force, angle, displacement, acceleration, speed, rotation, vibration and shocks. In the accelerometer 11, three separate outputs measure acceleration in axes X, Y and Z and this information can be used to determine the majority of parameters related to linear movement for each of the axes in a coordinate system.

Thanks to the data 9 recorded by the accelerometer 11, one can determine the direction and the value of acceleration of the cap 2, and determine the force, with which it was hit, and, furthermore, to determine the speed of the cap 2, its distance, position and orientation relative to the ground. Indications obtained from the accelerometer 11 may be then used to integrate the acceleration vector in order to determine the speed vector, or to determine the displacement—by re-integrating. Placed in the bottom 1 of the cap 2, the accelerometer 11 itself is an electromechanical device sensing static or dynamic acceleration forces. Static forces include gravity, whereas dynamic forces can include vibrations and movement. Measuring static acceleration relative to gravity, one can determine the cap 2 angle relative to the ground.

Sensing the dynamic acceleration, one can analyze the movement of the cap 2. Apart from determining the values of linear accelerations, it is possible to use them to determine the spatial position of the cap, and to execute specific interactions during its movement. Thanks to the accelerometer 11, one can detect even the slightest impact, otherwise invisible to the naked eye. This solution would allow for e.g. detecting impact with another object, such as another cap.

Figure 2A:
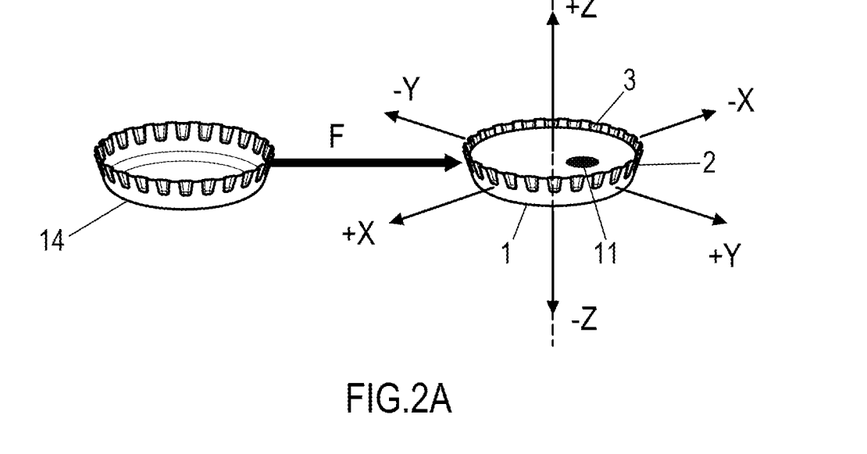
FIG. 2 shows a cap 14 hitting the cap 2.
Figure 2B:
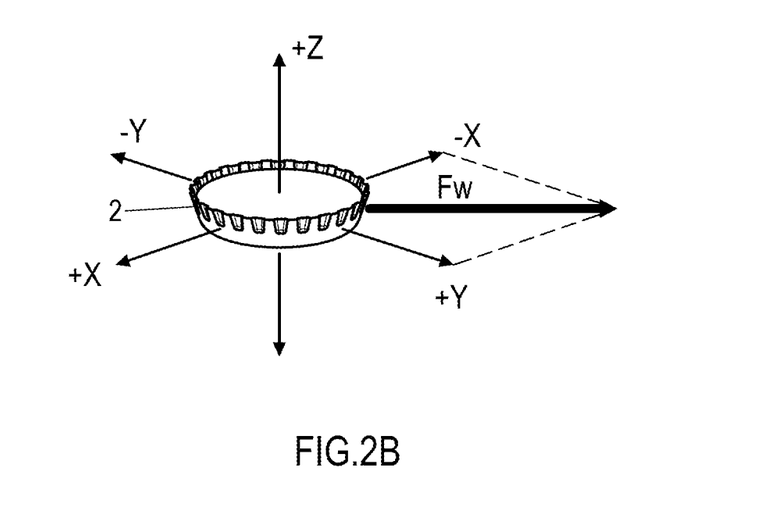

FIG. 2 presents a situation where cap 14 hits cap 2 with a force of impact presented as vector F. In the cap 2, below the teeth 3, in its bottom 1, there is an accelerometer 11 which measures the force presented as vector Fw which acts on the cap 2 after it is hit by cap 14. This allows for measuring the displacement, and thus the impact with another object, and the force, with which the cap 2 was hit by cap 14. In this case, it is also possible to measure the acceleration, speed and displacement of the cap 2 after impact.

Figure 3:
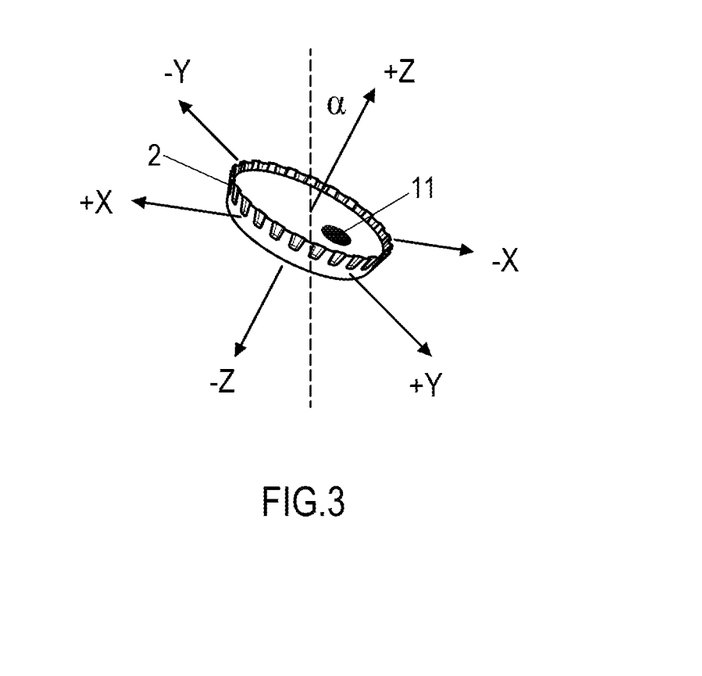
FIG. 3 shows the cap 2 changing position in axis Z by angle α in 3D space.

FIG. 3 presents a situation where the position of the cap 2 changes in axis Z by angle α in 3D space. For a three-dimensional accelerometer 11, changes in position can be detected for each of the three axes X, Y and Z.

A gyroscope is used if it is necessary to detect and measure the rotation of an object, its rotation angle, and its rotational speed. The gyroscope is primarily intended to monitor the rotations around the axis of the cap, and this type of movement differs from the remaining types, as the object in question can rotate but the force of gravity G applied on the gyroscope needs not change. Contrary to the accelerometer which measures the linear acceleration of a device, the gyroscope directly measures its orientation.

Figure 4:
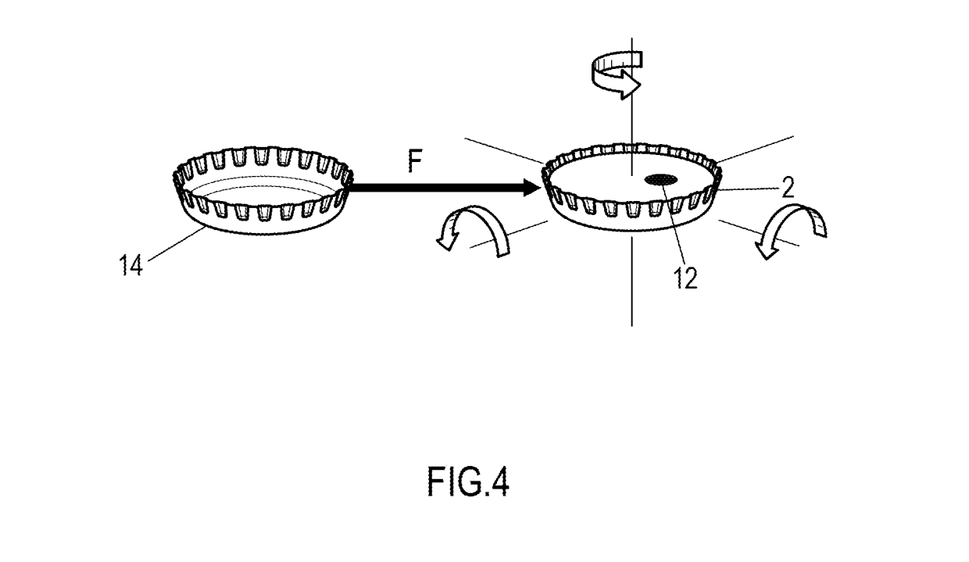
FIG. 4 shows the cap 14 hitting the cap 2 with a force having a vector of F.

The use of a gyroscope is illustrated in an embodiment of the solution in FIG. 4.

This figure presents cap 14 hitting cap 2 with a force having a vector of F. The cap 2 is equipped with a gyroscope 12. After the impact, the cap 2 is set into rotary motion. To better illustrate it, the movement was marked with thick red arrows. The gyroscope 12 detects rotations for each of three axes X, Y and Z, thus detecting impact with another object.

Figure 5:
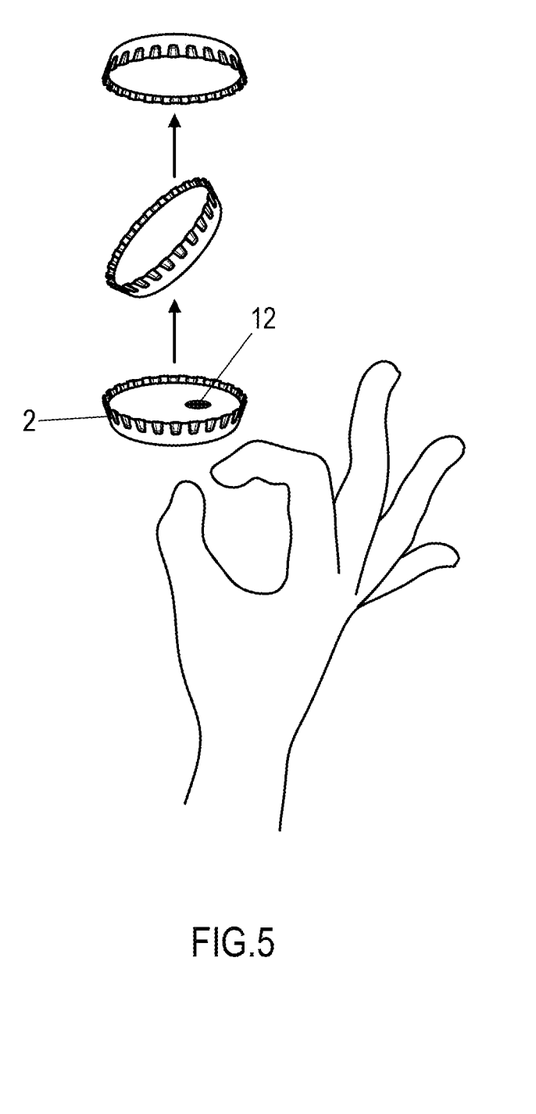
FIG. 5 shows the cap 2 equipped with a gyroscope 12.

FIG. 5 presents a cap 2 equipped with a gyroscope 12. The cap 2 revolves in the air after it is flicked by a finger upwards. In this case, the gyroscope 12 detects the number of revolutions of the cap 2 in the air.

It is also possible to combine an accelerometer and a gyroscope. In this case, the accelerometer is more accurate in static calculations, when the cap reaches a fixed reference point, whereas the gyroscope recognizes the cap's orientation when it is moving.

Figure 6:
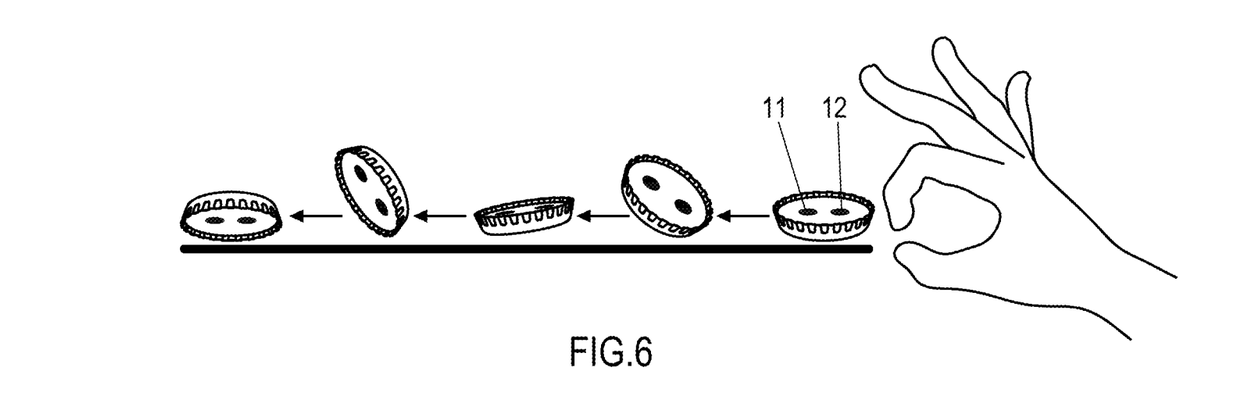
FIG. 6 shows fusion of an accelerometer 11 and a gyroscope 12.

This combination is presented in FIG. 6.

This figure presents a fusion of an accelerometer 11 and a gyroscope 12. This fusion can be used to trace and analyze the behavior of the cap 2 in 3D space after impact.

Figure 7A:
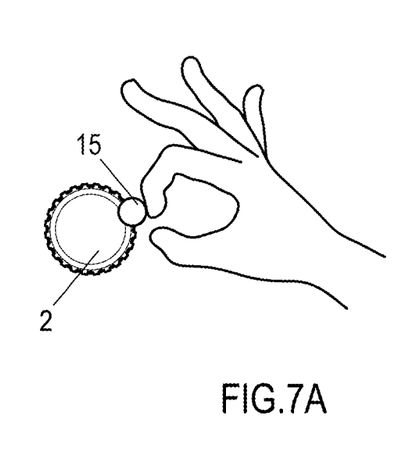
FIG. 7 shows another use of an accelerometer and a gyroscope.
Figure 7B:
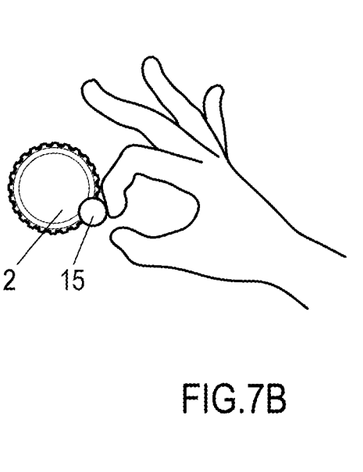
Figure 7C:
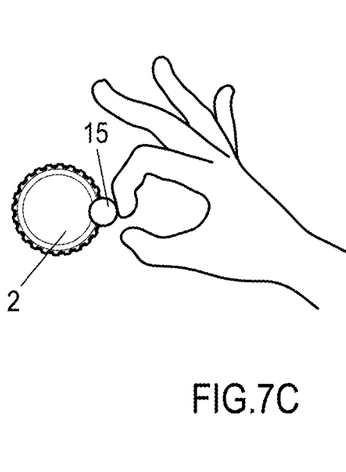

FIG. 7 presents another application of an accelerometer and a gyroscope.

A circle 15 marks the way, in which the cap 2 can be hit (flicked) at its different widths and heights. The point of impact affects the precision and force of the shot. Data from the accelerometer and gyroscope can be used to trace and analyze the behavior of the cap 2 after impact. These records can be used by the user to improve their technique.

It is also possible to use an additional measurement device in the form of a magnetometer, which was not presented in the figure. In this case, the magnetometer is installed next to the accelerometer and the gyroscope. Combining an accelerometer, a gyroscope and a magnetometer, the user can obtain more accurate data on the movements of the cap, particularly in 3D space. Thanks to the Bluetooth module, the data obtained from the device can be recorded, processed and analyzed on a mobile device using a mobile application.

Each change in the position of the cap, including among others its displacement, deflection or rotation in 3D space can be monitored thanks to the solution, which will allow for detecting the following activities of the cap: detection of impact with another object, cap acceleration, detection of an event, force, with which the cap was hit, force, with which the cap hit another object, number of cap revolutions in 3D space, current position of the cap in 3D space, analysis of movements in 3D space.

Data from the X, Y and Z axes will be used to detect the accuracy, at which the cap was hit. This affects the quality of the stroke, and particularly the acceleration, angle and rotation of the cap in motion. Each of these parameters can be sensed by the measurement device, that is by the accelerometer and the gyroscope.

Communication with a mobile device can be used to monitor, assess, and thus improve the force and technique of flicking the cap. Thanks to the solution, the player can significantly improve their technique.

The solution can be used to create a crown cap game which would combine a game consisting in its real, physical and non-virtual playing applying measurement instruments, with a mobile application for smartphones, tablets and other mobile devices.

The solution ensures that sports rivalry is always conducted according to the rules, and eliminates any disputes among the players concerning the movements and impacts of caps used in the game.

The solution will be used to play crown cap games, particularly during tournaments and competitions.

What is claimed is:

1. A crown cap game device using crown caps, comprising
   a measurement device configured with a Bluetooth module installed in a bottom of a crown cap, wherein the measurement device clings to a wall and the Bluetooth module provides a connection with a mobile device equipped with a mobile application which analyzes and displays data from the measurement device, and displays the data on a screen of the mobile device, wherein
   the game device is a single part device configured to travel in all directions along X, Y, and Z axes during a game, wherein the measurement device includes an accelerometer installed in the bottom of the crown cap, wherein
   based upon the data recorded by the accelerometer, a direction and a value of acceleration of the cap is determined, and determine the force, with which the crown cap was hit, to determine a speed of the cap, the cap distance, position and orientation relative to the ground, wherein
      in the accelerometer three separate outputs provide a measure of acceleration in axes X, Y and Z and this information can be used to determine parameters related to linear movement for each of the axes in a coordinate system; wherein
      the accelerometer is configured for sensing gravity, vibrations and movement of the cap, whereas measuring static acceleration relative to gravity can determine the cap angle relative to the ground, and wherein
      the accelerometer detects impact with another object, such as another cap, and wherein
      it is possible to measure the acceleration, speed and displacement of the cap after impact.

2. A crown cap game device using crown caps, comprising
   a measurement device configured with a Bluetooth module installed in a bottom of a crown cap, wherein the measurement device clings to a wall and the Bluetooth module provides a connection with a mobile device equipped with a mobile application which analyzes and displays data from the measurement device, and displays the data on a screen of the mobile device, wherein
   the game device is a single part device configured to travel in all directions along X, Y, and Z axes during a game, wherein the measurement device includes a gyroscope installed in the bottom of the crown cap, wherein
      the gyroscope is used to detect and measure the rotation of the crown cap, the cap rotation angle, and the cap rotational speed for each of three axes X, Y and Z, detecting impact with another object, and wherein
      the gyroscope detects the number of revolutions of the cap in the air.

3. A crown cap game device using crown caps, comprising
   a measurement device configured with a Bluetooth module installed in a bottom of a crown cap, wherein the measurement device clings to a wall and the Bluetooth module provides a connection with a mobile device equipped with a mobile application which analyzes and displays data from the measurement device, and displays the data on a screen of the mobile device, wherein
   the game device is a single part device configured to travel in all directions along X, Y, and Z axes during a game, wherein measurement devices include an accelerometer and a gyroscope installed in the bottom of the crown cap, wherein
   the accelerometer is more accurate in static calculations when the cap reaches a fixed reference point, whereas the gyroscope recognizes the cap's orientation when the cap is moving, and wherein fusion of the accelerometer and gyroscope can be used to trace and analyze the behavior of the cap after impact and in 3D space.

4. A crown cap game device using crown caps, comprising
   a measurement device configured with a Bluetooth module installed in a bottom of a crown cap, wherein the measurement device clings to a wall and the Bluetooth module provides a connection with a mobile device equipped with a mobile application which analyzes and displays data from the measurement device, and displays the data on a screen of the mobile device, and wherein
   the game device is a single part device configured to travel in all directions along X, Y, and Z axes during a game, wherein
   the measurement device includes an accelerometer installed in the bottom of the crown cap, wherein
   based upon the data recorded by the accelerometer, a direction and a value of acceleration of the cap is determined, and determine the force, with which the crown cap was hit, to determine a speed of the cap, the cap distance, position and orientation relative to the ground, wherein
      in the accelerometer three separate outputs provide a measure of acceleration in axes X, Y and Z and this information can be used to determine parameters related to linear movement for each of the axes in a coordinate system; wherein
      the accelerometer is configured for sensing gravity, vibrations and movement of the cap, whereas measuring static acceleration relative to gravity can determine the cap angle relative to the ground, wherein
      the accelerometer detects impact with another object, such as another cap, and wherein it is possible to measure the acceleration, speed and displacement of the cap after impact, and wherein
   by sensing the dynamic acceleration, one can analyze the movement of the cap, and wherein apart from determining the values of linear accelerations it is possible to use accelerations to determine the spatial position of the cap and to execute specific interactions during movement of the cap.

5. A crown cap game device using crown caps, comprising
   a measurement device configured with a Bluetooth module installed in a bottom of a crown cap, wherein the measurement device clings to a wall and the Bluetooth module provides a connection with a mobile device equipped with a mobile application which analyzes and displays data from the measurement device, and displays the data on a screen of the mobile device, and wherein
   the game device is a single part device configured to travel in all directions along X, Y, and Z axes during a game, wherein
   measurement devices includes an accelerometer and a gyroscope installed in the bottom of the crown cap, wherein
   the accelerometer is more accurate in static calculations when the cap reaches a fixed reference point, whereas the gyroscope recognizes the cap's orientation when the cap is moving, and wherein fusion of the accelerometer and gyroscope can be used to trace and analyze the behavior of the cap after impact and in 3D space, wherein an additional measurement device includes a magnetometer installed in the bottom of the crown cap, wherein the magnetometer is installed next to the accelerometer and the gyroscope, and wherein by combining the accelerometer, the gyroscope and the magnetometer a user can obtain more accurate data on the movements of the cap, particularly in 3D space, and wherein data from the X, Y and Z axes is used to detect the accuracy at which the cap was hit, what affects quality of the stroke, and particularly the acceleration, angle and rotation of the cap in motion sensed by the accelerometer and the gyroscope.

\* \* \* \* \*

UNITED STATES PATENT AND TRADEMARK OFFICE
CERTIFICATE OF CORRECTION

PATENT NO. : 10,765,933 B2  
APPLICATION NO. : 16/425263  
DATED : September 8, 2020  
INVENTOR(S) : Radoslaw Oryl Page 1 of 1

It is certified that error appears in the above-identified patent and that said Letters Patent is hereby corrected as shown below:

On the Title Page

Left Column, under item (65), under Prior Publication Data: US 2019/0366198 A1 Dec. 5, 2019, please insert:
-- (30) Foreign Application Priority Data
May 30, 2018 (PL)..........................P.425795 --

Signed and Sealed this  
Third Day of November, 2020

Andrei Iancu  
*Director of the United States Patent and Trademark Office*